(12) United States Patent
Son et al.

(10) Patent No.: US 9,982,578 B2
(45) Date of Patent: May 29, 2018

(54) CONTINUOUS VARIABLE VALVE DURATION APPARATUS AND ENGINE PROVIDED WITH THE SAME

(71) Applicant: HYUNDAI MOTOR COMPANY, Seoul (KR)

(72) Inventors: You Sang Son, Suwon-si (KR); Kyoung Pyo Ha, Seongnam-si (KR); Back Sik Kim, Osan-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 127 days.

(21) Appl. No.: 15/275,561

(22) Filed: Sep. 26, 2016

(65) Prior Publication Data

US 2017/0167323 A1 Jun. 15, 2017

(30) Foreign Application Priority Data

Dec. 11, 2015 (KR) ........................ 10-2015-0177487

(51) Int. Cl.
*F01L 13/00* (2006.01)
*F01L 1/34* (2006.01)
(Continued)

(52) U.S. Cl.
CPC ............ *F01L 13/0036* (2013.01); *F01L 1/047* (2013.01); *F01L 1/053* (2013.01); *F01L 1/34* (2013.01);
(Continued)

(58) Field of Classification Search
CPC ......... F01L 1/34; F01L 1/047; F01L 13/0015; F01L 1/053; F01L 2001/0475;
(Continued)

(56) References Cited

U.S. PATENT DOCUMENTS

| 5,924,334 A | 7/1999 | Hara et al. | |
| 2002/0129780 A1* | 9/2002 | Nohara | F01L 1/024 |
| | | | 123/90.16 |
| 2008/0060596 A1* | 3/2008 | Decuir | F01L 1/042 |
| | | | 123/90.16 |

FOREIGN PATENT DOCUMENTS

| JP | H06-185321 A | 7/1994 |
| JP | H09-041924 A | 2/1997 |

(Continued)

*Primary Examiner* — Mark Laurenzi
*Assistant Examiner* — Wesley Harris
(74) *Attorney, Agent, or Firm* — Brinks Gilson & Lione

(57) ABSTRACT

A continuous variable valve duration apparatus may include a camshaft, a first and second cam portions on which a cam is formed respectively, of which the camshaft is inserted thereto and of which relative phase angles with respect to the camshaft are variable, a first and second inner brackets transmitting rotation of the camshaft to the first and second cam portions respectively, a slider housing in which the first and second inner brackets are rotatably inserted, of which a relative position with respect to the camshaft is variable, and on which a control slot is formed, a cam cap rotatably supporting the first and the second cam portions and to which the slider housing is slidably mounted, a control shaft parallel to the camshaft and on which a control rod is eccentrically formed, an eccentric plate rotatably connected to the control rod and rotatably inserted into the control slot, a separation prevention pin disposed to inhibit the eccentric plate from being separated from the slider housing and a control portion selectively rotating the control shaft so as to controlling a position of the slider housing.

24 Claims, 13 Drawing Sheets

(51) Int. Cl.
　　　*F01L 1/356*　　(2006.01)
　　　*F16H 25/10*　　(2006.01)
　　　*F16H 1/16*　　　(2006.01)
　　　*F01L 1/047*　　(2006.01)
　　　*F01L 1/053*　　(2006.01)
　　　*F01M 9/10*　　　(2006.01)
　　　*F01M 11/02*　　(2006.01)
　　　*F02D 13/02*　　(2006.01)
　　　*F01L 1/344*　　(2006.01)

(52) U.S. Cl.
　　　CPC .......... *F01L 1/356* (2013.01); *F01L 13/0015* (2013.01); *F01L 13/0026* (2013.01); *F01M 9/10* (2013.01); *F01M 11/02* (2013.01); *F02D 13/0207* (2013.01); *F16H 1/16* (2013.01); *F16H 25/10* (2013.01); *F01L 2001/0475* (2013.01); *F01L 2001/0476* (2013.01); *F01L 2001/0535* (2013.01); *F01L 2001/0537* (2013.01); *F01L 2001/34483* (2013.01); *F01L 2013/0073* (2013.01); *F01L 2013/103* (2013.01); *F01L 2810/02* (2013.01); *Y02T 10/18* (2013.01)

(58) Field of Classification Search
　　　CPC ................ F01L 2013/103; F01L 1/356; F01L 2001/0476; F01L 2001/0537; F01L 2001/34483; F01L 2810/02; F01L 13/0026; F01L 2013/0073; F16H 25/10; F16H 1/16
　　　USPC ............................................ 123/90.15–90.17
　　　See application file for complete search history.

(56) References Cited

FOREIGN PATENT DOCUMENTS

| JP | 2002-213262 A | 7/2002 |
| JP | 5582195 B2 | 7/2014 |
| JP | 2015-117692 A | 6/2015 |

\* cited by examiner

CONTINUOUS VARIABLE VALVE DURATION APPARATUS AND ENGINE PROVIDED WITH THE SAME

CROSS-REFERENCE TO RELATED APPLICATION

This application claims priority to and the benefit of Korean Patent Application No. 10-2015-0177487, filed on Dec. 11, 2015, the entire contents of which are incorporated herein by reference.

FIELD

The present disclosure relates to a continuous variable valve duration apparatus and an engine provided with the same.

BACKGROUND

The statements in this section merely provide background information related to the present disclosure and may not constitute prior art.

An internal combustion engine generates power by burning fuel in a combustion chamber in an air media drawn into the chamber. Intake valves are operated by a camshaft in order to intake the air, and the air is drawn into the combustion chamber while the intake valves are open. In addition, exhaust valves are operated by the camshaft, and a combustion gas is exhausted from the combustion chamber while the exhaust valves are open.

Optimal operation of the intake valves and the exhaust valves depends on a rotation speed of the engine. That is, an optimal lift or optimal opening/closing timing of the valves depends on the rotation speed of the engine. In order to achieve such optimal valve operation depending on the rotation speed of the engine, various researches, such as designing of a plurality of cams and a continuous variable valve lift (CVVL) that can change valve lift according to engine speed, have been undertaken.

Also, in order to achieve such an optimal valve operation depending on the rotation speed of the engine, research has been undertaken on a continuously variable valve timing (CVVT) apparatus that enables different valve timing operations depending on the engine speed. The general CVVT may change valve timing with a fixed valve opening duration.

However, the general CVVL and CVVT are complicated in construction and are expensive in manufacturing cost.

The above information disclosed in this Background section is only for enhancement of understanding of the background of the present disclosure and therefore it may contain information that does not form the prior art that is already known to a person of ordinary skill in the art.

SUMMARY

Various aspects of the present disclosure provide a continuous variable valve duration apparatus and an engine provided with the same which may vary opening duration of a valve according to operation conditions of an engine, with a simple construction.

A continuous variable valve duration apparatus according to an exemplary form of the present disclosure may include: a camshaft; first and second cam portions on which a cam is formed respectively, the camshaft inserted to the first and second cam portions of which relative phase angles with respect to the camshaft are variable; first and second inner brackets transmitting rotation of the camshaft to the first and second cam portions respectively; a slider housing in which the first and second inner brackets are rotatably inserted, of which a relative position with respect to the camshaft is variable, and on which a control slot is formed; a cam cap rotatably supporting the first and the second cam portions, and the slider housing slidably mounted to the cam cap; a control shaft which is parallel to the camshaft and on which a control rod is eccentrically formed; an eccentric plate rotatably connected to the control rod and rotatably inserted into the control slot; a separation prevention pin configured to inhibit or prevent the eccentric plate from being separated from the slider housing; and a control portion selectively rotating the control shaft so as to control a position of the slider housing.

A housing pin insertion hole in which the separation prevention pin is inserted may be formed in the slider housing and an eccentric plate pin insertion hole in which the separation prevention pin is inserted may be formed in the eccentric plate along a circumferential direction thereof.

An eccentric plate hole may be eccentrically formed in the eccentric plate and the control rod may be inserted into the eccentric plate hole.

A cam key may be formed on the first and second cam portions respectively, a first and a second sliding holes may be formed in the first and second inner brackets respectively, a cam key pin, on which a cam key slot where the cam key is slidably inserted therein is formed, may be rotatably inserted into the each first sliding hole, a camshaft pin may be connected to the camshaft, and a slider pin, on which a camshaft pin slot where the camshaft pin is slidably inserted therein is formed, may be rotatably inserted into the each second sliding hole.

The continuous variable valve duration apparatus may further include a slider housing bearing disposed between the slider housing and the first and the second inner bracket respectively.

The continuous variable valve duration apparatus may further include a spacer disposed within the slider housing to inhibit or prevent rotations of the first and second inner brackets from being interrupted.

A cam key may be is formed on the first and second cam portions respectively, a first and a second sliding holes may be formed in the first and second inner brackets respectively, a cam key pin, on which a cam key slot where the cam key is slidably inserted therein is formed, may be rotatably inserted into the each first sliding hole, and a slider pin may include a pin body and a pin head integrally formed with the pin body, and wherein the pin body may be slidably inserted into the camshaft and the pin head may be rotatably inserted into the second sliding hole.

A camshaft oil hole may be formed in the camshaft along a length direction thereof, a body oil hole communicated with the camshaft oil hole may be formed in the pin body, and an oil groove communicated with the body oil hole may be formed in the pin head.

A shaft hole to which the control shaft is inserted may be formed in the cam cap.

A cam cap guide for guiding movement of the slider housing may be formed on the cam cap.

A slider housing oil line for supplying oil to the cam cap guide is formed in the slider housing.

The cam may be formed on the first and the second cam portions as a pair, a cam cap connecting portion may be formed between the two cams (i.e., the pair cams) of each cam portion (i.e., the first and second cam portions), and a cam support for rotatably supporting the cam connecting portion may be is formed on the cam cap.

The control portion may include a control motor and a planetary gear set connected to the control shaft and transmitting rotation of the control motor to the control shaft.

The control portion may further include a worm wheel connected to the planetary gear set, and a worm gear engaged with the worm wheel.

The control portion may further include a control portion housing and a housing cover connected to the control portion housing, wherein the planetary gear set, the worm wheel and the worm gear may be disposed within the control portion housing.

The control portion may further include a position sensor disposed within the control portion housing for detecting rotation of the control shaft.

An engine according to an exemplary form of the present disclosure includes: a camshaft; first and second cam portions on which a cam is formed respectively, the camshaft inserted to the first and second cam portions of which relative phase angles with respect to the camshaft are variable; first and second inner brackets transmitting rotation of the camshaft to the first and second cam portions respectively; a slider housing in which the first and second inner brackets are rotatably inserted, of which a relative position with respect to the camshaft is variable, and on which a control slot is formed; a cam cap rotatably supporting the first and the second cam portions and the slider housing slidably mounted to the cam cap; a control shaft which is parallel to the camshaft and on which a control rod is eccentrically formed; an eccentric plate rotatably connected to the control rod and rotatably inserted into the control slot; a separation prevention pin configured to inhibit or prevent the eccentric plate from being separated from the slider housing; and a control portion selectively rotating the control shaft so as to control a position of the slider housing.

A housing pin insertion hole in which the separation prevention pin is inserted may be formed in the slider housing and an eccentric plate pin insertion hole in which the separation prevention pin is inserted may be formed in the eccentric plate along a circumferential direction thereof.

An eccentric plate hole may be eccentrically formed in the eccentric plate and the control rod may be inserted into the eccentric plate hole.

A cam key may be formed on the first and second cam portions respectively, a first and a second sliding holes may be formed in the first and second inner brackets respectively, a cam key pin, on which a cam key slot where the cam key is slidably inserted therein is formed, may be rotatably inserted into the each first sliding hole, a camshaft pin may be connected to the camshaft, a slider pin, on which a camshaft pin slot where the camshaft pin is slidably inserted therein is formed, may be rotatably inserted into the each second sliding hole, and a slider housing bearing may be disposed between the slider housing and the first and the second inner brackets respectively.

A cam key may be is formed on the first and second cam portions respectively, a first and a second sliding holes may be formed in the first and second inner brackets respectively, a cam key pin, on which a cam key slot where the cam key is slidably inserted therein is formed, may be rotatably inserted into the each first sliding hole, and a slider pin may include a pin body and a pin head integrally formed with the pin body, and wherein the pin body may be slidably inserted into the camshaft and the pin head may be rotatably inserted into the second sliding hole.

A camshaft oil hole may be formed in the camshaft along a length direction thereof, a body oil hole communicated with the camshaft oil hole may be formed in the pin body, and an oil groove communicated with the body oil hole may be formed in the pin head.

The control portion may include a control portion housing, a housing cover connected to the control portion housing, a control motor, a worm gear transmitting rotation of the control motor, a worm wheel disposed within the control portion housing and engaged with the worm gear, and a planetary gear set disposed within the control portion housing and transmitting rotation of the worm wheel to the control shaft.

The control portion may further include a position sensor disposed within the control portion housing for detecting rotation of the control shaft.

As described above, the continuous variable valve duration apparatus according to an exemplary form of the present disclosure may vary an opening duration of a valve according to operation conditions of an engine, with a simple construction.

The exemplary continuous variable valve duration apparatus of the present disclosure may be reduced in size and thus the entire height of a valve train may be reduced.

Since the continuous variable valve duration apparatus may be applied to an existing engine without excessive modification, thus productivity may be enhance and production cost may be reduced.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
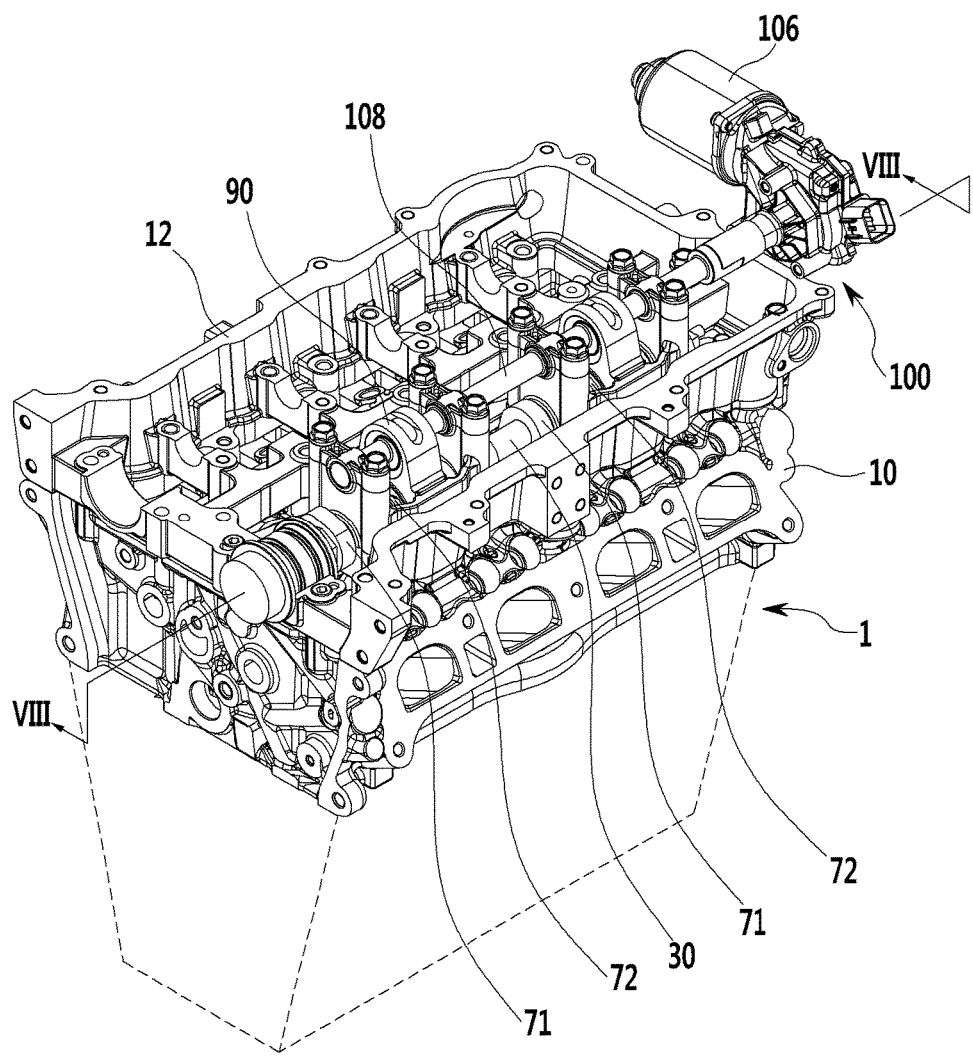
FIG. 1 is a perspective view of an engine provided with a continuous variable valve duration apparatus according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following detailed description, only certain exemplary forms of the present disclosure have been shown and described, simply by way of illustration.

As those skilled in the art would realize, the described forms may be modified in various different ways, all without departing from the spirit or scope of the present disclosure A part irrelevant to the description will be omitted to clearly describe the present disclosure, and the same or similar elements will be designated by the same reference numerals throughout the specification.

In the drawings, the thickness of layers, films, panels, regions, etc., are exaggerated for clarity.

Throughout the specification and the claims, unless explicitly described to the contrary, the word "comprise" and variations such as "comprises" or "comprising", will be understood to imply the inclusion of stated elements but not the exclusion of any other elements.

An exemplary form of the present disclosure will hereinafter be described in detail with reference to the accompanying drawings.

Figure 2:
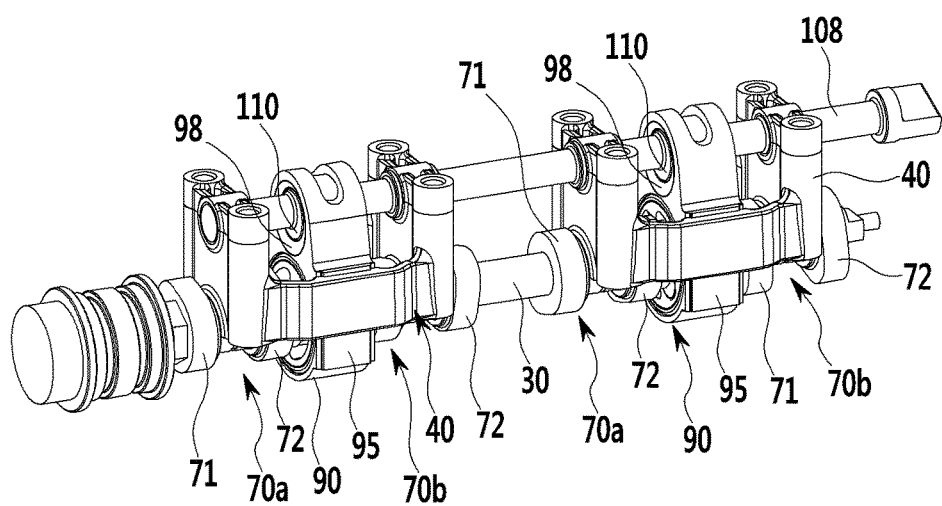
FIG. 2 is a perspective view of a continuous variable valve duration apparatus according to an exemplary form of the present disclosure.

FIG. 1 is a perspective view of an engine provided with a continuous variable valve duration apparatus according to an exemplary form of the present disclosure, and FIG. 2 is a perspective view of a continuous variable valve duration apparatus according to an exemplary form of the present disclosure.

Figure 3:
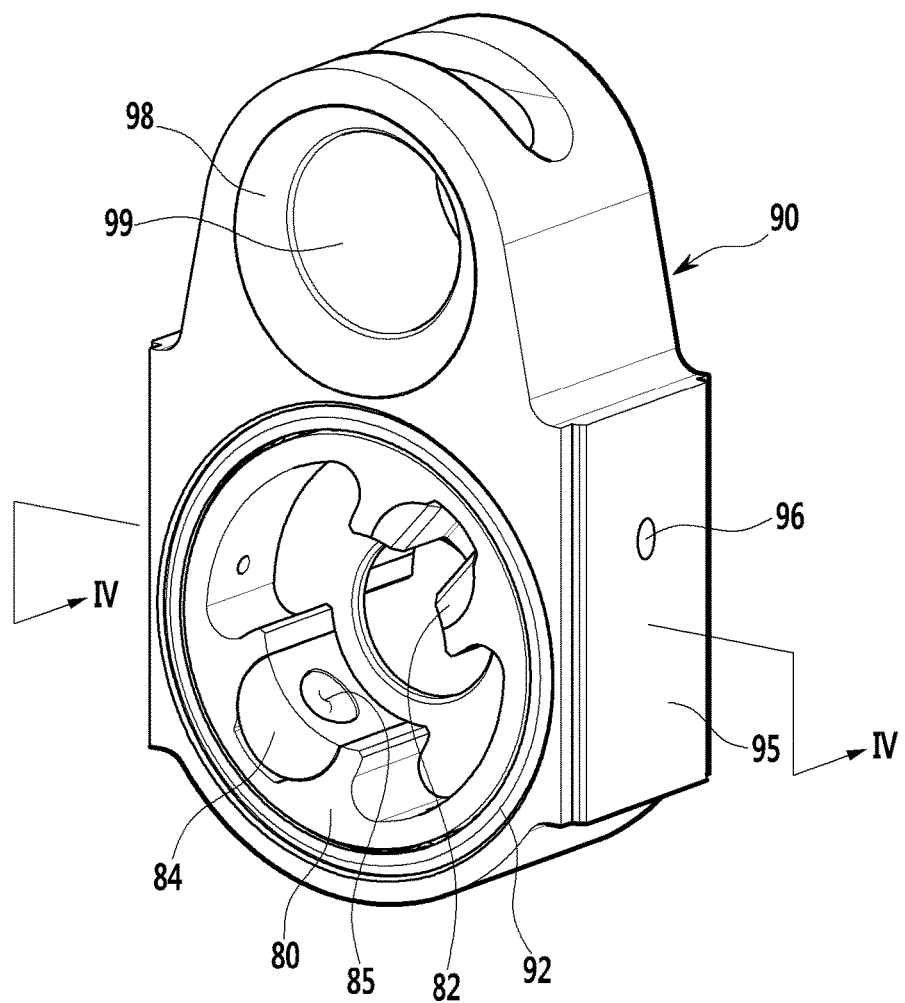
FIG. 3 is a perspective view of a slider housing of a continuous variable valve duration apparatus according to an exemplary form of the present disclosure.
Figure 4:
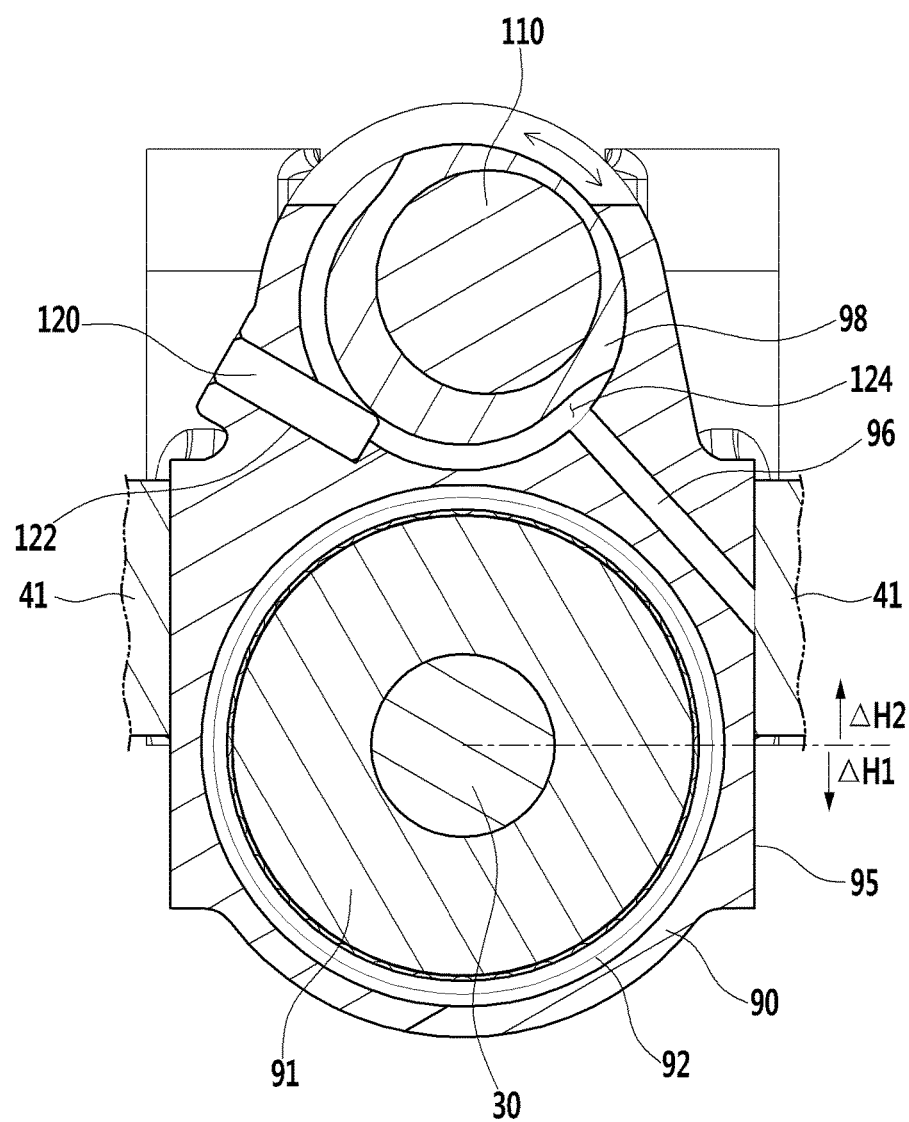
FIG. 4 is a cross-sectional view along line IV-IV of FIG. 3.

FIG. 3 is a perspective view of a slider housing of a continuous variable valve duration apparatus according to an exemplary form of the present disclosure, and FIG. 4 is a cross-sectional view along line IV-IV of FIG. 3.

Figure 5:
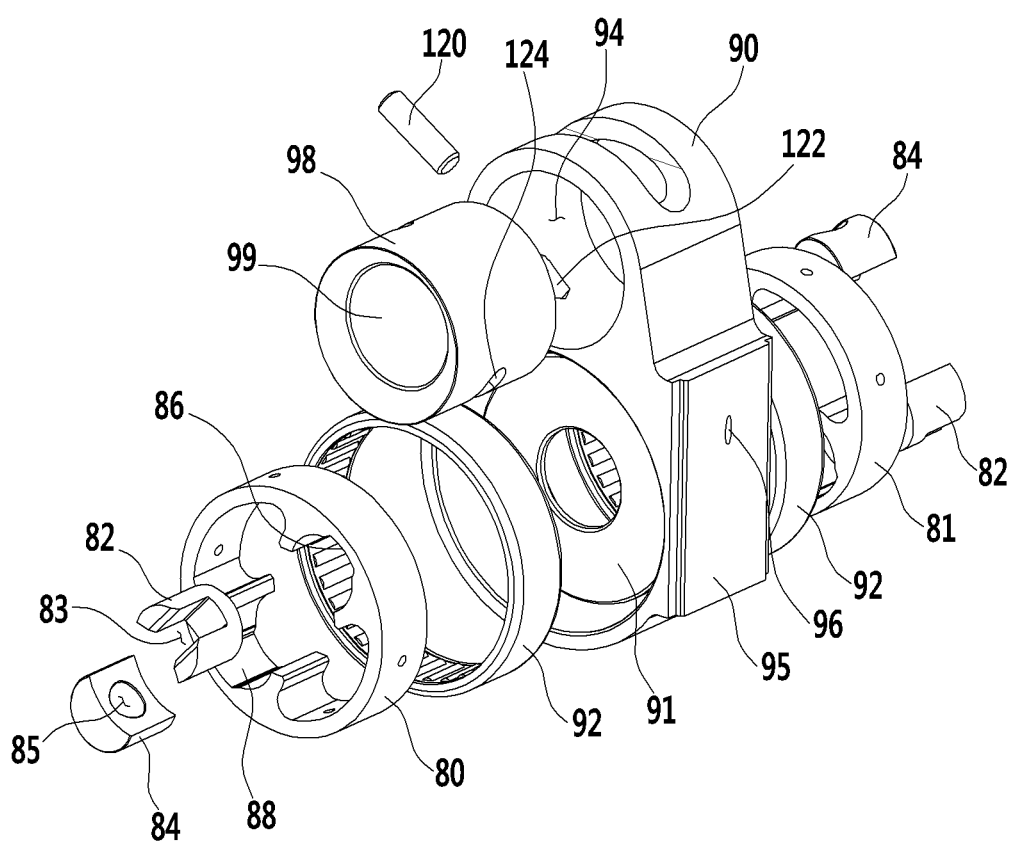
FIG. 5 to FIG. 7 are exploded perspective views of an exemplary continuous variable valve duration apparatus of the present disclosure.
Figure 6:
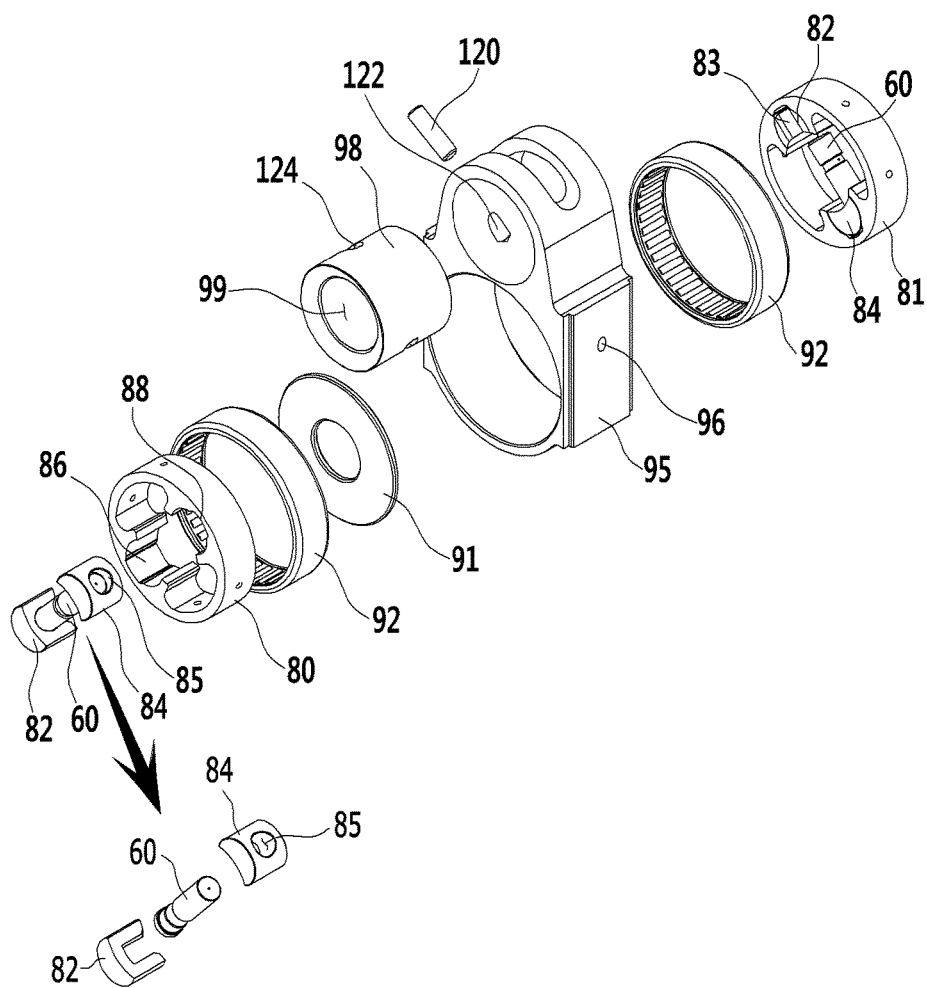
Figure 7:
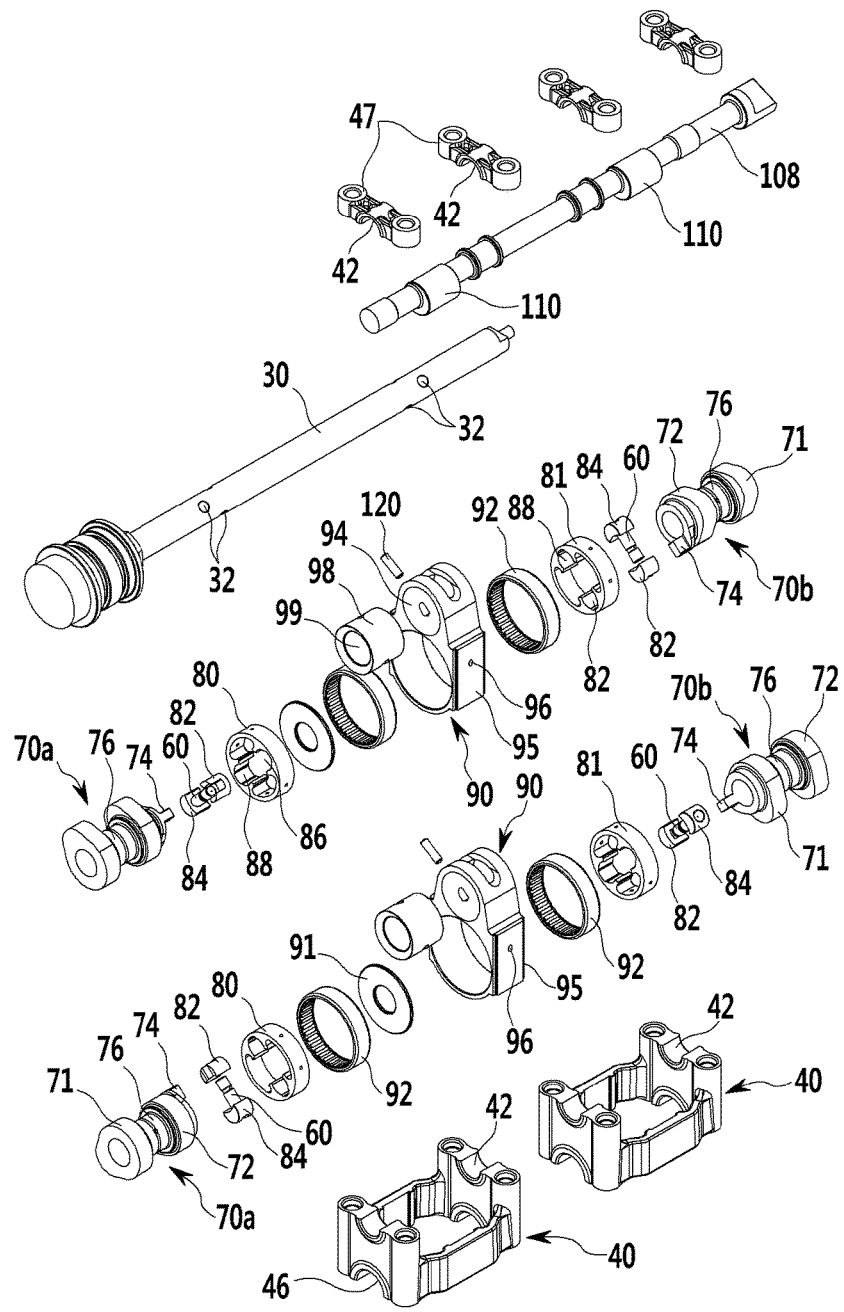
Figure 8:
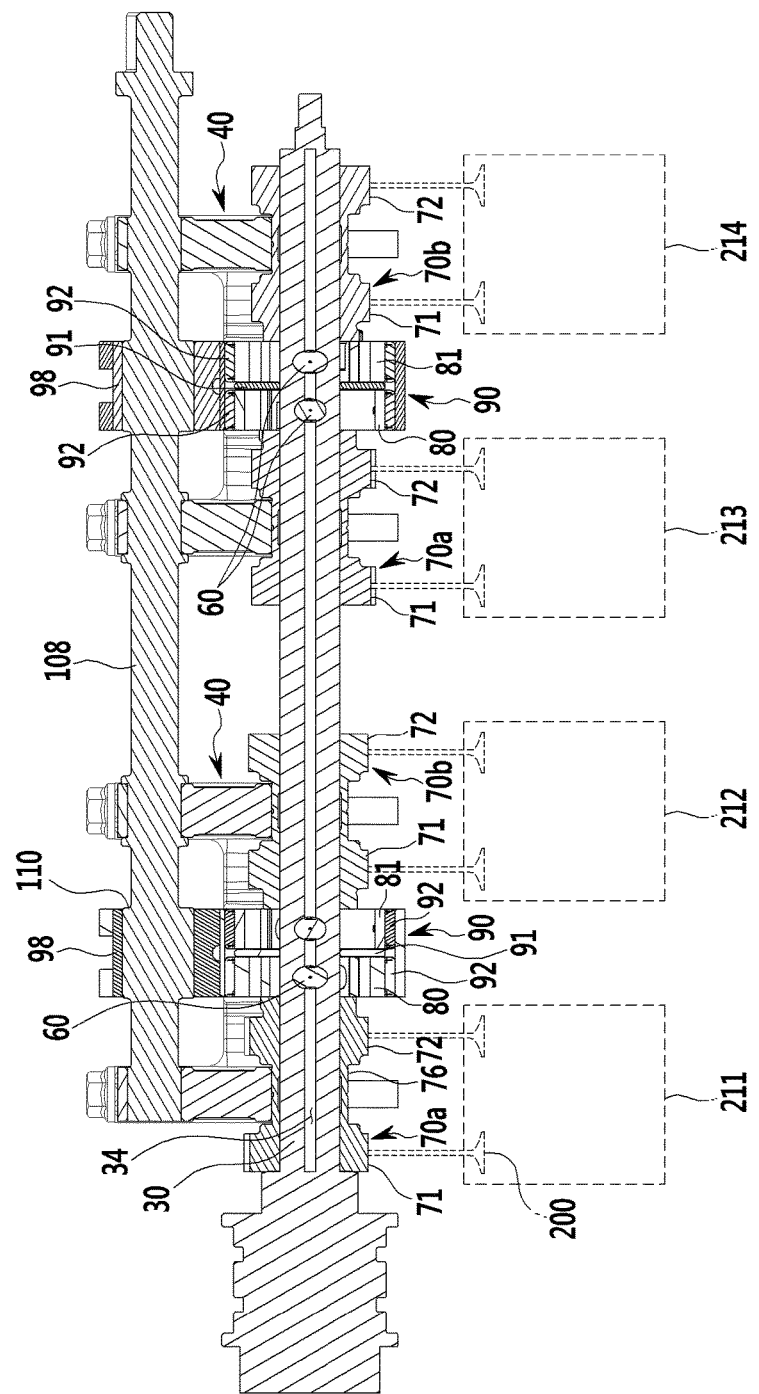
FIG. 8 is a cross-sectional view along line VIII-VIII of FIG. 1.

FIG. 5 to FIG. 7 are exploded perspective views of an exemplary continuous variable valve duration apparatus of the present disclosure, and FIG. 8 is a cross-sectional view along line VIII-VIII of FIG. 1.

Referring to FIG. 1 to FIG. 6, an engine 10 according to an exemplary form of the present disclosure includes a cylinder head 10, a cam carrier 12 mounted to the cylinder head 10 and a continuous variable valve duration apparatus mounted to the cam carrier 12.

The continuous variable valve duration apparatus includes a camshaft 30, a first and second cam portions 70a and 70b on which a cam 71 and 72 is formed respectively, of which the camshaft 30 is inserted thereto and of which relative phase angles with respect to the camshaft 30 are variable, a first and second inner brackets 80 and 81 transmitting rotation of the camshaft 30 to the first and second cam portions 70a and 70b respectively, a slider housing 90 in which the first and second inner brackets 80 and 81 are rotatably inserted, of which a relative positions with respect to the camshaft 30 is variable, and on which a control slot 94 is formed, a cam cap 40 rotatably supporting the first and the second cam portions 70a and 70b and to which the slider housing 90 is slidably mounted, a control shaft 108 parallel to the camshaft 30 and on which a control rod 110 is eccentrically formed, an eccentric plate 98 rotatably connected to the control rod 110 and rotatably inserted into the control slot 94, a separation prevention pin 120 disposed for inhibiting or preventing the eccentric plate 98 from being separated from the slider housing 90, and a control portion 100 selectively rotating the control shaft 108 so as to controlling a position of the slider housing 90.

The camshaft 30 may be an intake camshaft or an exhaust camshaft and is rotated by a cam sprocket 48 connected to a crankshaft.

In the drawing, 4 cylinders 211, 212, 213 and 214 are formed to the engine, but it is not limited thereto.

A housing pin insertion hole 122 in which the separation prevention pin 120 is inserted is formed to the slider housing 90 and an eccentric plate pin insertion hole 124 in which the separation prevention pin 120 is inserted is formed to the eccentric plate 98 along circumferential direction thereof.

The eccentric plate pin insertion hole 124 is formed along circumferential direction of the eccentric plate 98 and the eccentric plate 98 may be rotated within the control slot 94.

An eccentric plate hole 99 is eccentrically formed to the eccentric plate 98 and the control rod 110 is inserted into the eccentric plate hole 99.

When the control shaft 108 rotates, the control rod 110 eccentrically formed to the control shaft 108 rotates eccentrically, and the eccentric plate 98 rotates relatively within to the control slot 94. Then the slider housing 90 moves upward or downward.

The rotation of the control shaft 108 is changed to the movement upward or downward of the slider housing 90 through the control rod 110 eccentrically formed to the control shaft 108 and the eccentric plate hole 99 eccentrically formed to the eccentric plate 98, and thus movement of the slider housing 90 may be performed smoothly.

And since the separation prevention pin 120 is inserted into the housing pin insertion hole 122 and the eccentric plate pin insertion hole 124, thus the eccentric plate 98 may not be separated from the control slot 94.

Two cams 71 and 72 are formed to the first and the second cam portions 70a and 70b respectively and the cam connecting portion 76 is formed between the two cams 71 and 72. A cam support 46 rotatably supports the cam connecting portion 76 and is formed to the cam cap 40.

The cams 71 and 72 rotate to open valves 200.

A cam key 74 is formed to the first and second cam portions 70a and 70b respectively and a first sliding hole 86 and a second sliding hole 88 are formed to the first and second inner brackets 80 and 81 respectively.

A cam key pin 82 of which a cam key slot 83 where the cam key 74 is slidably inserted therein is formed thereto and the cam key pin 82 is rotatably inserted into the each first sliding hole 86.

A camshaft hole 32 is formed to the camshaft 30 and a camshaft pin 60 is inserted into the camshaft hole 32 to be connected to the camshaft 30. And a slider pin 84 of which a camshaft pin slot 85 where the camshaft pin 60 is slidably inserted therein is formed thereto and the slider pin 84 is rotatably inserted into the each second sliding hole 88.

A slider housing bearing 92 in disposed between each slider housing 90 and the first and the second inner brackets 80 and 81 thus relative rotations of each slider housing 90 and the first and the second inner brackets 80 and 81 may be smoothly performed. In the drawings, the slider housing bearing 92 may be a needle bearing, a ball bearing, a roller bearing and so on may be applied thereto.

A spacer 91 is disposed within the slider housing 90 to inhibit or prevent rotations of the first and second inner brackets 80 and 81 from being interrupted.

As shown in FIG. 7, since the slider housing 90 is disposed between the first cam portion 70a and the second cam portion 70b, engine layout may be simplified and one slider housing 90 may control rotational speed of the first cam portion 70a and the second cam portion 70b simultaneously. Thus, the continuous variable valve duration apparatus may be constructed with simplified and elements number may be reduced.

Also, since elements for controlling the valve duration may be reduced, thus power loss of the engine may be reduced.

A cam cap guide 41 guiding movement of the slider housing 90 is formed to the cam cap 40. A slider housing guide surface 95 is formed to the slider housing 90, and the cam cap guide 41 contacts the slider housing guide surface 95 to guide movement of the slider housing 90. Thus the slider housing 90 may move without oscillation or vibration.

A slider housing oil line 96 for supplying oil to the cam cap guide 41 is formed to the slider housing 90 thus the movement of the slider housing 90 smoothly performed.

A shaft hole 42 in which the control shaft 108 is inserted is formed to the cam cap 40 for stably supporting the control shaft 108.

Two cams 71 and 72 are formed to the first and the second cam portions 70a and 70b respectively, the cam connecting portion 76 is formed between the two cams 71 and 72, and a cam support 46 rotatably supporting the cam connecting portion 76 is formed to the cam cap 40.

The cam cap 40 may guide the movement of the slider housing 90, support the rotation of the control shaft 108 and rotatably support the first and the second cam portions 70a and 70b, and may simplify a structure and reduce elements of the continuous duration apparatus.

Figure 9:
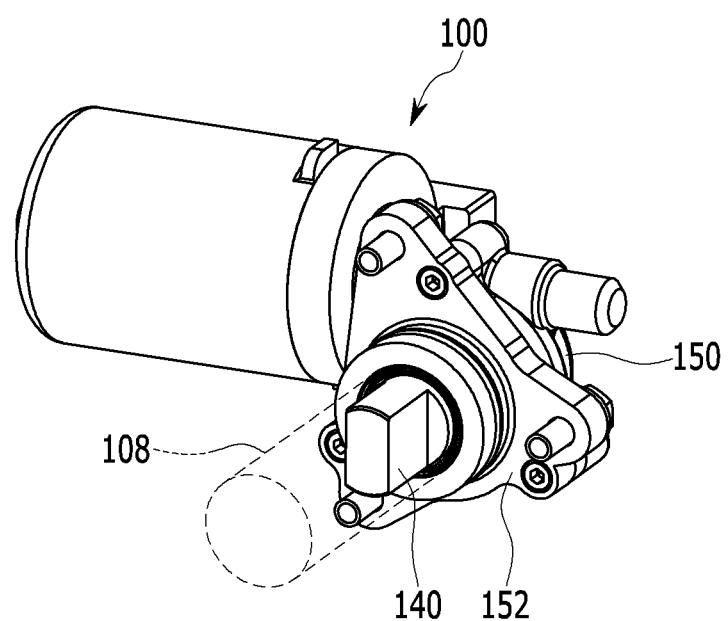
FIG. 9 is a perspective view of a control portion of a continuous variable valve duration apparatus according to an exemplary form of the present disclosure.
Figure 10:
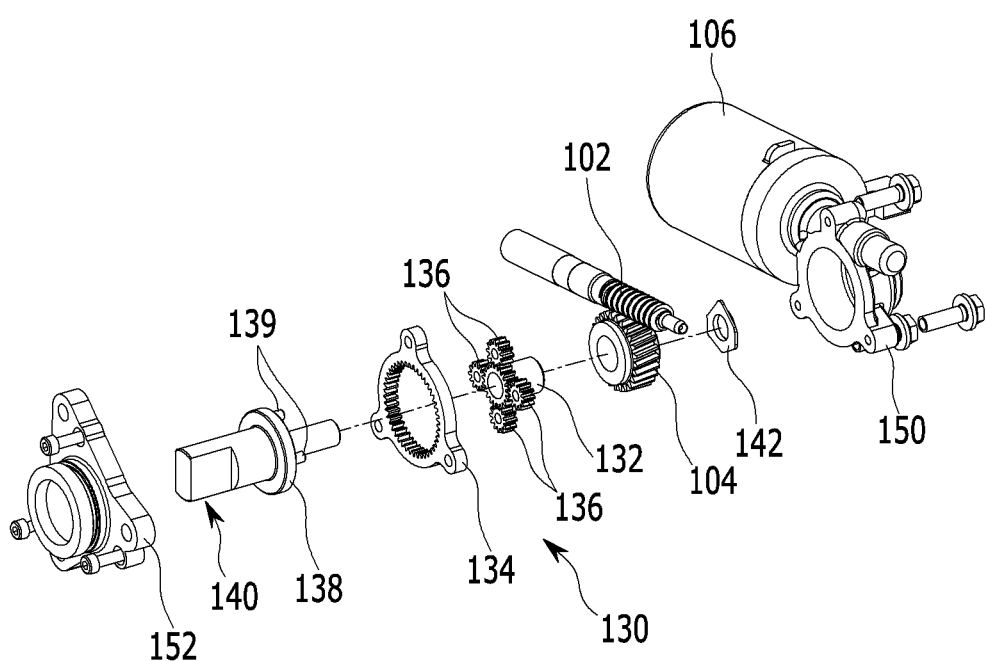
FIG. 10 is an exploded perspective view of a control portion of a continuous variable valve duration apparatus according to an exemplary form of the present disclosure.

FIG. 9 is a perspective view of a control portion of a continuous variable valve duration apparatus according to an exemplary form of the present disclosure, and FIG. 10 is an exploded perspective view of a control portion of a continuous variable valve duration apparatus according to an exemplary form of the present disclosure.

Referring to FIG. 9 and FIG. 10, the control portion 100 includes a control motor 106 and a planetary gear set 130 connected to the control shaft 108 and transmitting rotation of the control motor 106. The planetary gear set 130 may connects the control motor 106 and the control shaft 108 and increase gear ratio, thus motor capacity of the control motor 106 may be reduced.

The control portion 100 may further include a worm wheel 104 connected to the planetary gear set 130 and a worm gear 102 engaged with worm wheel 104. By applying the worm gear 102, the worm wheel 104 and the planetary gear set 130, gear ratio may be further increased, thus motor capacity of the control motor 106 may be further reduced.

The control portion 100 may further include a control portion housing 150, and a housing cover 152 connected to the control portion housing 150. And the planetary gear set 130, the worm wheel 104 and the worm gear 102 are disposed within the control portion housing 150.

Since the planetary gear set 130, the worm gear 102 and the worm wheel 104 are disposed within the control portion housing 150, thus engine layout may be simplified.

A connection shaft 140 on which a planetary gear cage 138 and a planetary gear shaft 139 are formed is connected with the control shaft 108.

The planetary gear set 130 includes a sun gear 132 receiving rotation of the control motor 106 through the worm wheel 104, ring gear 134 and a planetary gear 136 engaged with the sun gear 132 and the ring gear 134.

The ring gear 134 is connected to the housing cover 152, the planetary gear 136 is connected to the planetary gear shaft 139 and the rotation of the control motor 106 is reduced in speed and transmitted to the control shaft 108.

A position sensor 142 disposed within the control portion housing 150 for detecting the rotation of the control shaft 108.

The position sensor 142 detects rotations of the connection shaft 140, the sun gear 132 or the worm wheel 104 and outputs corresponding signal.

Figure 11:
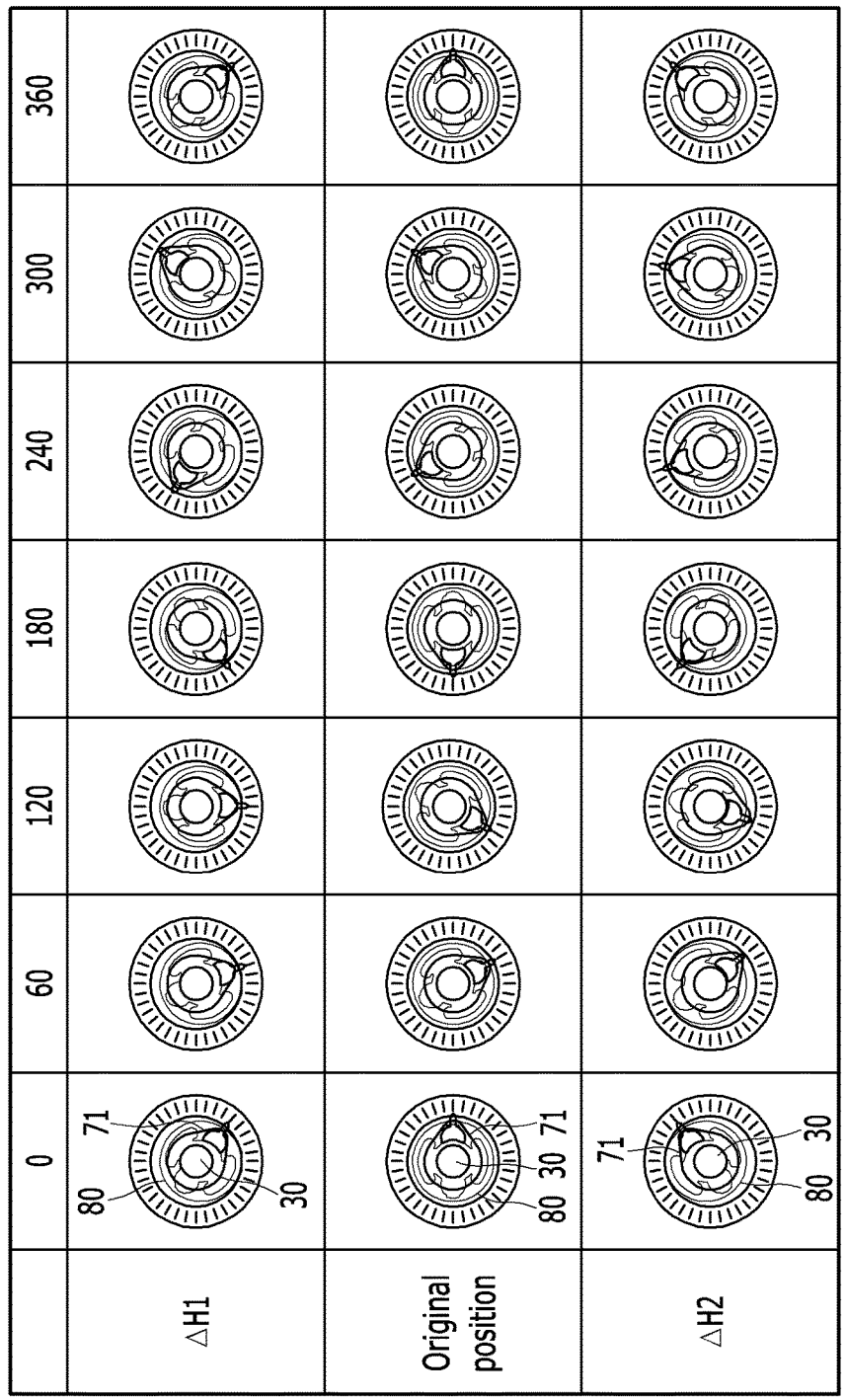
FIG. 11 is a table showing various operations of an exemplary continuous variable valve duration apparatus of the present disclosure.
Figure 12:
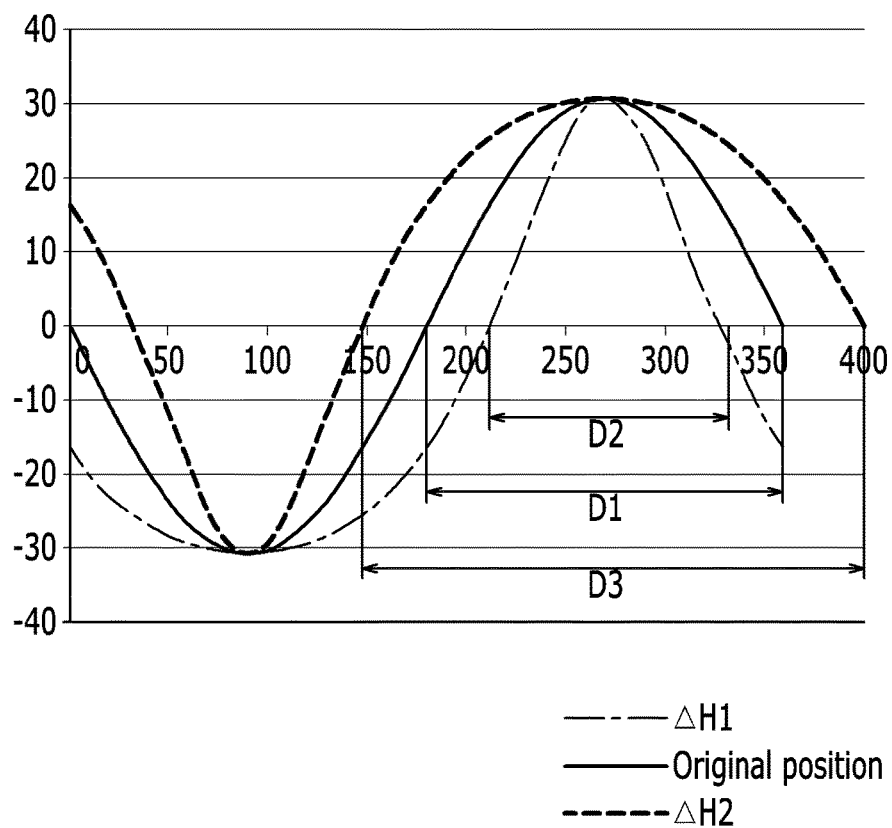
FIG. 12 is a graph showing various operations of an exemplary continuous variable valve duration apparatus of the present disclosure.

FIG. 11 is a table showing various operations of an exemplary continuous variable valve duration apparatus of the present disclosure, and FIG. 12 is a graph showing various operations of an exemplary continuous variable valve duration apparatus of the present disclosure.

Referring to FIG. 1 to FIG. 12, operations of the exemplary continuous variable valve duration apparatus will be described.

When rotation centers of the camshaft 30 and the first and second inner brackets 80 and 81 are coincident, that is, the slider housing 90 is positioned at an original position as shown in FIG. 11, the cams 71 and 72 rotate with the same phase angle of the camshaft 30. That is, the cams 71 and 72 and the camshaft 30 rotate with the same speed.

According to engine operation states, an ECU (engine control unit or electric control unit) transmits control signals to the control motor 106 of the control portion 100 to rotate the control shaft 108. Then, the control rod 110 eccentrically formed to the control shaft 108 is rotated to rotate the eccentric plate 98. The rotation of the eccentric plate 98 induces movement of the slider housing 90 along the cam cap guide 41.

That is, the rotation of the control shaft 108 is changed to the movement upward or downward of the slider housing 90 through the control rod 110 eccentrically formed to the control shaft 108 and the eccentric plate hole 99 eccentrically formed to the eccentric plate 98, and thus movement of the slider housing 90 may be performed smoothly.

According to the rotation of the control shaft 108, positions of the slider housing 90 and the first and the second inner brackets 80 and 81 with respect to a rotation center of the camshaft 30 are changed upward or downward.

When, the position of the slider housing 90 with respect to the camshaft 30 is changed, the relative rotation speed of the cams 71 and 72 with respect to the rotation speed of the camshaft 30 are changed.

While the camshaft pin 60 is rotated together with the camshaft 30, the camshaft pin 60 is slidable within the camshaft pin slot 85, the slider pin 84 is rotatably inserted into the second sliding hole 88, the cam key pin 82 is rotatably inserted into the first sliding hole 82, and the cam key 74 is slidable within the cam key slot 83. Thus the relative rotation speed of the cams 71 and 72 with respect to the rotation speed of the camshaft 30 is changed.

As shown in FIG. 4, while the phase angle of the camshaft 30 is constantly changed when the relative position of the slider housing 90 with respect to the rotation center of the camshaft 30 is changed downward as ΔH1, as shown in FIG. 11, the rotation speed of the cams 71 and 72 is relatively slower than rotation speed of the camshaft 30 near 60 to 120 degree, then the rotation speed of the cams 71 and 72 is relatively faster than rotation speed of the camshaft 30 near 240 to 300 degree.

As shown in FIG. 4, while the phase angle of the camshaft 30 is constantly changed when the relative position of the slider housing 90 with respect to the rotation center of the camshaft 30 is changed upward as ΔH2, as shown in FIG. 11, the rotation speed of the cams 71 and 72 is relatively faster than rotation speed of the camshaft 30 near 60 to 120 degree, then the rotation speed of the cams 71 and 72 is relatively slower than rotation speed of the camshaft 30 near 240 to 300 degree.

That is, as shown in FIG. 12 valve duration D2 in the case that the relative position of the slider housing 90 is changed to ΔH1 is shorter than valve duration D1 in the case that the position of the slider housing 90 is at the original position.

Also, valve duration D3 in the case that the relative position of the slider housing 90 is changed to ΔH2 is longer than valve duration D1 in the case that the position of the slider housing 90 is at the original position.

In FIG. 12, for better comprehension and ease of description, peak points in FIG. 10 are constant, but it is not limited thereto.

According to adjusting contacting positions of the valve 200 and the cam 71 and 72, contacting angles of the valve 200 and the cam 71 and 72, a position of the cam key 74 and so on, valve duration may be enlarged by advancing opening timing and retarding closing timing of the valve 200. Or, valve duration may be shortened by retarding opening timing and advancing closing timing of the valve 200.

Also, opening timing of the valve 200 may be constant and closing timing of the valve 200 may be retarded or advanced as requested.

Also, closing timing of the valve 200 may be constant and opening timing of the valve 200 may be retarded or advanced as requested.

Figure 13:
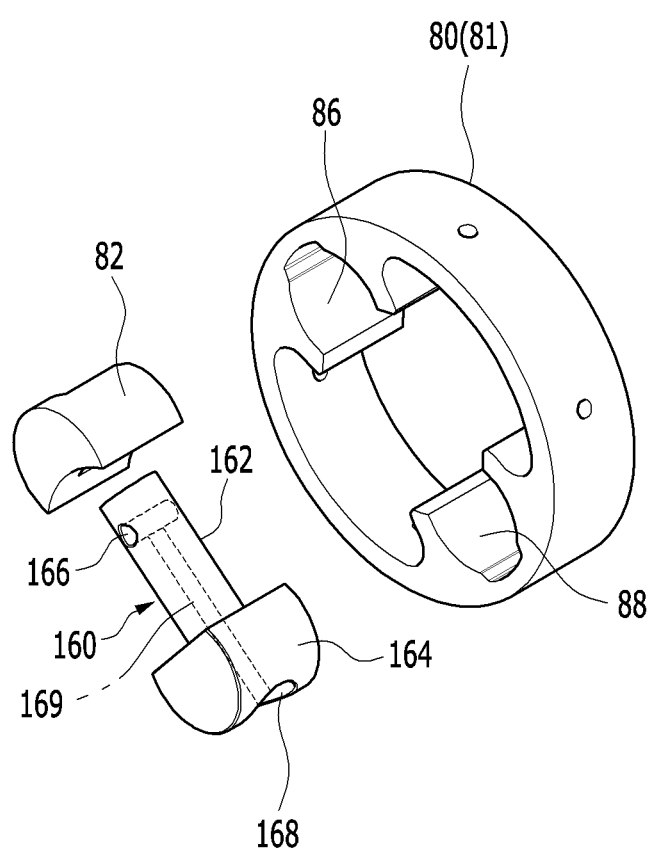
FIG. 13 is a drawing showing a slider pin of a continuous variable valve duration apparatus according to a modified form of the present disclosure.

FIG. 13 is a drawing showing a slider pin of a continuous variable valve duration apparatus according to a modified form of the present disclosure.

In the exemplary form, the camshaft pin and the slider pin are disconnected, however a slider pin 160 as shown in FIG. 10 includes a pin body 162 slidably inserted into the camshaft hole 32 of camshaft 30 and a pin head 164 integrally formed with the pin body 162 and rotatably inserted into the second sliding hole 88.

A camshaft oil hole 34 (referring to FIG. 8) is formed to the camshaft 30 along a length direction thereof and a body oil hole 166 communicated with the camshaft oil hole 34 is formed to the pin body 162.

And an oil groove 168 communicated with the body oil hole 166 is formed to the pin head 164 through a communicating hole 169.

Since lubricant may be supplied from the camshaft oil hole 34 to the oil groove 168 through the body oil hole 166 and the communicating hole 169, thus friction between the pin head 164 and the second sliding hole 88 may be reduced.

Except the slider pin, operations and structures of the continuous variable valve duration apparatus according to a modified form of the present disclosure are the same of the exemplary form described above, repeated description will be omitted.

As described above, the exemplary continuous variable valve duration apparatus of the present disclosure may perform various valve durations according to operation conditions of an engine.

The exemplary continuous variable valve duration apparatus of the present disclosure may be reduced in size and thus the entire height of a valve train may be reduced.

Particularly, since the motor and so on of the control portion may be mounted outside of the cam carrier thus the entire height of an engine may be reduced.

Since the continuous variable valve duration apparatus may be applied to an existing engine without excessive modification, thus productivity may be enhance and production cost may be reduced.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the appended claims.

<Description of symbols>

| | |
|---|---|
| 1: engine | 10: cylinder head |
| 12: cam carrier | 30: camshaft |
| 32: camshaft hole | 40: cam cap |
| 41: cam cap guide | 42: shaft hole |
| 46: cam support | 47: cam cap cover |
| 60: camshaft pin | 70a, 70b: first, second cam portion |
| 71, 72: cam | 74: cam key |
| 76: cam connecting portion | 80: first inner bracket |
| 81: second inner bracket | 82: cam key pin |
| 83: cam key slot | 84: slider pin |
| 85: camshaft pin slot | 86: first sliding hole |
| 88: second sliding hole | 90: slider housing |
| 91: spacer | 92: slider housing bearing |
| 94: control slot | 95: slider housing guide surface |
| 96: slider housing oil line | 98: eccentric plate |
| 99: eccentric plate hole | 100: control portion |
| 102: worm wheel | 104: worm gear |
| 106: control motor | 108: control shaft |
| 110; control rod | 120: separation prevention pin |
| 122: housing pin insertion hole | |
| 124: eccentric plate pin insertion hole | |
| 130: planetary gear set | 132: sun gear |
| 134: ring gear | 136: planetary gear |
| 138: planetary gear cage | 139: planetary gear shaft |
| 140: connection shaft | 142: position sensor |
| 150: control portion housing | 152: housing cover |
| 160: slider pin | 162: pin body |
| 164: pin head | 166: body oil hole |
| 168: oil groove | 169: communicate hole |
| 200: valve | 211-214: 1-4 cylinders |

What is claimed is:

1. A continuous variable valve duration apparatus comprising:
    a camshaft;
    first and second cam portions on which a cam is formed respectively, the camshaft inserted to the first and second cam portions of which relative phase angles with respect to the camshaft are variable;
    first and second inner brackets configured to transmit rotation of the camshaft to the first and second cam portions respectively;
    a slider housing in which the first and second inner brackets are rotatably inserted, a relative position of the slider housing with respect to the camshaft being variable, and a control slot formed on the slider housing;
    a cam cap configured to rotatably support the first and the second cam portions, the slider housing slidably mounted to the cam cap;
    a control shaft which is parallel to the camshaft and on which a control rod is eccentrically formed;

an eccentric plate rotatably connected to the control rod and rotatably inserted into the control slot;

a separation prevention pin configured to inhibit the eccentric plate from being separated from the slider housing; and a control portion configured to selectively rotate the control shaft so as to control a position of the slider housing.

2. The continuous variable valve duration apparatus of claim 1, wherein
a housing pin insertion hole in which the separation prevention pin is inserted is formed in the slider housing; and
an eccentric plate pin insertion hole in which the separation prevention pin is inserted is formed in the eccentric plate along a circumferential direction thereof.

3. The continuous variable valve duration apparatus of claim 1, wherein
an eccentric plate hole is eccentrically formed in the eccentric plate; and
the control rod is inserted into the eccentric plate hole.

4. The continuous variable valve duration apparatus of claim 1, wherein
a cam key is formed on the first and second cam portions, respectively;
first and a second sliding holes are formed in the first and second inner brackets, respectively;
a cam key pin, on which a cam key slot where the cam key is slidably inserted therein is formed, is rotatably inserted into the each first sliding hole;
a camshaft pin is connected to the camshaft; and
a slider pin, on which a camshaft pin slot where the camshaft pin is slidably inserted therein is formed, is rotatably inserted into the each second sliding hole.

5. The continuous variable valve duration apparatus of claim 1, further comprising a slider housing bearing disposed between the slider housing and the first and the second inner brackets, respectively.

6. The continuous variable valve duration apparatus of claim 1, further comprising a spacer disposed within the slider housing and configured to inhibit rotations of the first and second inner brackets from being interrupted.

7. The continuous variable valve duration apparatus of claim 1, wherein
a cam key is formed on the first and second cam portions, respectively;
a first and a second sliding holes are formed in the first and second inner brackets, respectively;
a cam key pin, on which a cam key slot where the cam key is slidably inserted therein is formed, is rotatably inserted into the each first sliding hole; and
a slider pin includes a pin body and a pin head integrally formed with the pin body, and
wherein the pin body is slidably inserted into the camshaft and the pin head is rotatably inserted into the second sliding hole.

8. The continuous variable valve duration apparatus of claim 7, wherein
a camshaft oil hole is formed in the camshaft along a length direction thereof;
a body oil hole communicated with the camshaft oil hole is formed in the pin body; and
an oil groove communicated with the body oil hole is formed in the pin head.

9. The continuous variable valve duration apparatus of claim 1, wherein a shaft hole to which the control shaft is inserted is formed in the cam cap.

10. The continuous variable valve duration apparatus of claim 1, wherein a cam cap guide configured to guide movement of the slider housing is formed on the cam cap.

11. The continuous variable valve duration apparatus of claim 10, wherein a slider housing oil line configured to supply oil to the cam cap guide is formed in the slider housing.

12. The continuous variable valve duration apparatus of claim 1, wherein
the cam is formed on the first and the second cam portions as a pair;
a cam cap connecting portion is formed between the paired cams of each of the first and second cam portions; and
a cam support configured to rotatably support the cam connecting portion is formed on the cam cap.

13. The continuous variable valve duration apparatus of claim 1, wherein the control portion comprises:
a control motor; and
a planetary gear set connected to the control shaft and configured to transmit rotation of the control motor to the control shaft.

14. The continuous variable valve duration apparatus of claim 13, wherein the control portion further comprises:
a worm wheel connected to the planetary gear set; and
a worm gear engaged with the worm wheel.

15. The continuous variable valve duration apparatus of claim 14, wherein the control portion further comprises:
a control portion housing; and
a housing cover connected to the control portion housing,
wherein the planetary gear set, the worm wheel and the worm gear are disposed within the control portion housing.

16. The continuous variable valve duration apparatus of claim 15, wherein the control portion further comprises:
a position sensor disposed within the control portion housing and configured to detect rotation of the control shaft.

17. An engine comprising:
a camshaft;
first and second cam portions on which a cam is formed respectively, the camshaft being inserted to the first and second cam portions of which relative phase angles with respect to the camshaft are variable;
first and second inner brackets configured to transmit rotation of the camshaft to the first and second cam portions respectively;
a slider housing in which the first and second inner brackets are rotatably inserted, a relative position of the slider housing with respect to the camshaft being variable, and a control slot formed on the slider housing;
a cam cap configured to rotatably support the first and the second cam portions, the slider housing slidably mounted to the cam cap;
a control shaft which is parallel to the camshaft and on which a control rod is eccentrically formed;
an eccentric plate rotatably connected to the control rod and rotatably inserted into the control slot;
a separation prevention pin configured to inhibit the eccentric plate from being separated from the slider housing; and
a control portion configured to selectively rotate the control shaft so as to control a position of the slider housing.

18. The engine of claim 17, wherein
a housing pin insertion hole in which the separation prevention pin is inserted is formed in the slider housing; and
an eccentric plate pin insertion hole in which the separation prevention pin is inserted is formed in the eccentric plate along a circumferential direction thereof.

19. The engine of claim 18, wherein
a camshaft oil hole is formed in the camshaft along a length direction thereof;
a body oil hole communicated with the camshaft oil hole is formed in the pin body; and
an oil groove communicated with the body oil hole is formed in the pin head.

20. The engine of claim 17, wherein
an eccentric plate hole is eccentrically formed in the eccentric plate; and
the control rod is inserted into the eccentric plate hole.

21. The engine of claim 17, wherein
a cam key is formed on the first and second cam portions, respectively;
first and a second sliding holes are formed in the first and second inner brackets, respectively;
a cam key pin, on which a cam key slot where the cam key is slidably inserted therein is formed, is rotatably inserted into the each first sliding hole;
a camshaft pin is connected to the camshaft;
a slider pin, on which a camshaft pin slot where the camshaft pin is slidably inserted therein is formed, is rotatably inserted into the each second sliding hole; and
a slider housing bearing is disposed between the slider housing and the first and the second inner brackets, respectively.

22. The engine of claim 17, wherein
a cam key is formed on the first and second cam portions, respectively;
first and a second sliding holes are formed in the first and second inner brackets, respectively;
a cam key pin, on which a cam key slot where the cam key is slidably inserted therein is formed, is rotatably inserted into the each first sliding hole; and
a slider pin includes a pin body and a pin head integrally formed with the pin body, and
wherein the pin body is slidably inserted into the camshaft and the pin head is rotatably inserted into the second sliding hole.

23. The engine of claim 17, wherein the control portion comprises:
a control portion housing;
a housing cover connected to the control portion housing;
a control motor;
a worm gear configured to transmit rotation of the control motor;
a worm wheel disposed within the control portion housing and engaged with the worm gear; and
a planetary gear set disposed within the control portion housing and configured to transmit rotation of the worm wheel to the control shaft.

24. The engine of claim 23, wherein the control portion further comprises:
a position sensor disposed within the control portion housing and configured to detect rotation of the control shaft.

* * * * *